United States Patent [19]

Sato et al.

[11] 4,077,943

[45] Mar. 7, 1978

[54] CURABLE ORGANOPOLYSILOXANE COMPOSITIONS

[75] Inventors: Yasuhiko Sato; Hiroshi Inomata, both of Annaka, Japan

[73] Assignee: Shin-Etsu Chemical Co., Ltd., Tokyo, Japan

[21] Appl. No.: 725,280

[22] Filed: Sep. 21, 1976

[30] Foreign Application Priority Data

Sep. 26, 1975  Japan .................................. 50/116795

[51] Int. Cl.$^2$ ............................................... C08G 77/04
[52] U.S. Cl. ........................ 260/46.5 UA; 260/37 SB; 260/46.5 G; 260/825; 428/447
[58] Field of Search .................. 260/46.5 UA, 46.5 G, 260/825

[56] References Cited

U.S. PATENT DOCUMENTS

| | | | |
|---|---|---|---|
| 3,974,122 | 8/1976 | Sato et al. ......................... | 260/37 SB |
| 3,996,195 | 12/1976 | Sato et al. ....................... | 260/46.5 Y |

*Primary Examiner*—Melvyn I. Marquis
*Attorney, Agent, or Firm*—Toren, McGeady and Stanger

[57] ABSTRACT

Organopolysiloxane compositions are provided which are curable to elastomers and exhibit an excellent adhesion to the various surfaces of metals, glasses, ceramics and the like. The organopolysiloxane composition comprises (a) a diorganopolysiloxane terminated at both chain ends with vinyl groups directly bonded to the terminal silicon atoms in a molecule, (b) an organohydrogenpolysiloxane having at least two hydrogen atoms bonded directly to the silicon atoms in a molecule and at least one epoxy or ester group bonded to the silicon atom through an Si—C linkage in a molecule, and (c) a platinum catalyst. The compositions are useful for applications, such as, potting of electronic circuit units, coating of electrical parts, impregnation of fly-back transformers for television sets and coating of junctions for semiconductor devices.

17 Claims, No Drawings

CURABLE ORGANOPOLYSILOXANE COMPOSITIONS

BACKGROUND OF THE INVENTION

This invention relates to novel organopolysiloxane compositions capable of curing to elastic body exhibiting a strong and tight adhesion to the various surfaces of metals, glasses, ceramics and the like. In particular, this invention relates to organopolysiloxane compositions curable by the mechanism of the so-called hydrosilation reaction in which crosslinkings are formed by the addition reaction between the vinyl groups directly bonded to the silicon atoms in the organopolysiloxane molecules and the hydrogen atoms directly bonded to the silicon atoms in the organohydrogenpolysiloxane molecules in the presence of a platinum compound as the catalyst.

Known organopolysiloxane compositions curable by the mechanism of hydrosilation are, for example, compositions comprising an organohydrogenpolysiloxane, a vinyl-containing organopolysiloxane and a platinum catalyst, as disclosed in U.S. Pat. Nos. 2,915,497, 3,284,406, 3,436,366 and 3,699,073 and organopolysiloxane compositions in which the hydrogen atoms directly bonded to the silicon atoms, are in the form of a partial addition product of α-methylstyrene and an organohydrogenpolysiloxane, as disclosed in U.S. Pat. No. 3,631,220. These prior art organopolysiloxane compositions are disadvantageous because they are deficient in their adhesion especially to metallic surfaces. This lack of adhesion has tended to cause cleavages at places between the cured material and the substrate surface. Due to the possible intrusion of water into the cleavages, an adverse effect on the application of the compositions, such as, the potting of electronic circuit units, coating of electrical parts, impregnation of fly-back transformers for television sets and coating of junctions for semiconductor devices, results.

SUMMARY OF THE INVENTION

It is therefore the object of the present invention to provide a novel and improved organopolysiloxane composition curable to an elastomeric body, free of the above-described disadvantages encountered in the prior art compositions.

The composition of the present invention comprises
(a) a diorganopolysiloxane having a viscosity in the range of from 10 to 1,000,000 centistokes at 25° C and expressed by the general formula

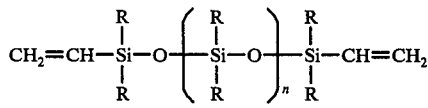

where R is a monovalent hydrocarbon group having no aliphatic unsaturation and $n$ is a positive integer,
(b) an organohydrogenpolysiloxane having at least two hydrogen atoms bonded directly to the silicon atoms in a molecule and at least one epoxy or ester group, or at least one each of these groups, bonded to the silicon atoms through silicon-bonded carbon atoms in a molecule, or a mixture of at least 1% by weight of the same organohydrogenpolysiloxane and not more than 99% by weight of an organohydrogenpolysiloxane which contains at least two hydrogen atoms bonded directly to the silicon atoms in a molecule but no epoxy or ester group, the amount of the organohydrogenpolysiloxane or the mixture being such that from 0.5 to 4.0 hydrogen atoms bonded directly to the silicon atoms are provided per vinyl group bonded directly to the silicon atoms in component (a) above, and
(c) platinum or a platinum compound in a catalytic amount.

The cured elastomers obtained from the composition of the present invention exhibit sufficient elasticity and an excellent adhesion to the surfaces of metals, glasses, ceramics and the like, as well as remarkable transparency.

DETAILED DESCRIPTION OF THE PREFERRED EMBODIMENTS

Component (a) useful in the compositions of the present invention is a linear diorganopolysiloxane terminated at both chain ends with vinyl groups bonded directly to the terminal silicon atoms and expressed by the above-mentioned general formula (I). The organic group represented by R in the formula is selected from alkyl groups, such as, methyl and ethyl groups, and aryl groups, such as, phenyl group, optionally in combination of two or more of them. The viscosity of component (a) is preferably in the range of from 10 to 1,000,000 centistokes at 25° C or, more preferably, from 500 to 10,000 centistokes at 25° C. Diorganopolysiloxanes having a lower viscosity will produce insufficient elasticity in the cured products, while those having a higher viscosity will produce a poor flowability in the resultant compositions, in turn, resulting in difficulties in the coating or potting applications of the compositions without being diluted by organic solvents.

The following are representative of the diorganopolysiloxanes suitable as component (a) in the compositions of the present invention. In the molecular formulas, $p$ is an integer of from 50 to 500, and $q$ and $r$ each are positive integers with the provisoes that $(q + r) = 50$ to $500$ and that $r/q = 1$ to $9$.

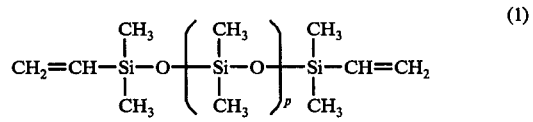

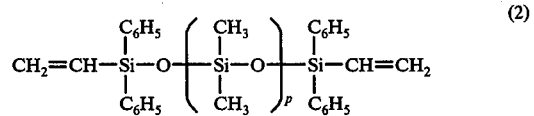

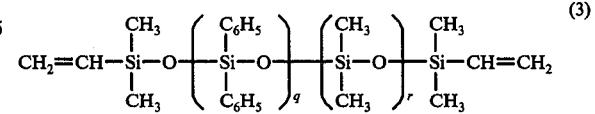

The vinyl group-terminated diorganopolysiloxanes can be prepared by any conventional methods.

The organohydrogenpolysiloxane useful as component (b) in the compositions of the invention serves as a crosslinking agent. It may be an epoxy and/or ester group-containing organohydrogenpolysiloxane, which is hereinafter referred to as organohydrogenpolysiloxane b-1, or a mixture of the same organohydrogenpolysiloxane b-1 with an organohydrogenpolysiloxane containing no epoxy or ester group, which is hereinafter referred to as organohydrogenpolysiloxane b-2.

The epoxy group mentioned here may be in the form of, for example, a glycidyl group or a 3,4-epoxycyclohexyl group. The ester group is expressed by the formula

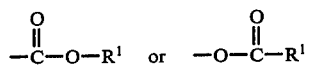

where $R_1$ is a lower alkyl group, such as, methyl and ethyl. It is possible that both epoxy and ester groups are present simultaneously in a molecule in the form of a glycidyl ester expressed by the following formula.

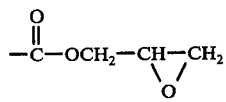

The epoxy and/or ester group containing organohydrogenpolysiloxane b-1 functions to improve the adhesivity of the resulting composition to the surfaces of various materials, such as, metals, glasses, ceramics and the like. For the purpose, the epoxy or ester groups should be bonded to the silicon atoms through carbon atoms adjacent to the silicon atoms in the siloxane molecules. The mechanisms by which the presence of the epoxy or ester groups contributes to the adhesion of the composition is not clear, but it is presumed that the large polarity of the groups works advantageously for the purpose.

The number of the epoxy or ester groups present in a molecule of the siloxane b-1 is not critical, although it is desirable that two or more of these groups are contained in a molecule if this does not present difficulty in the preparation of the organhydrogenpolysiloxanes.

The organohydrogenpolysiloxane b-1 is synthesized by the partial addition reaction between an organohydrogenpolysiloxane having at least three hydrogen atoms bonded directly to the silicon atoms in a molecule and an organic compound having a vinyl group simultaneously in combination with at least one epoxy or ester group, or at least one each of the groups in a molecule (see, for example, Japanese Patent Disclosure No. 50-64393 and Japanese Patent Disclosure No. 50-39345). It is preferable, though not critical, that organohydrogenpolysiloxane b-1 has from 3 to 300 silicon atoms in a molecule.

Illustrative of organohydrogenpolysiloxanes b-1 are the compounds expressed by the following structural formulas.

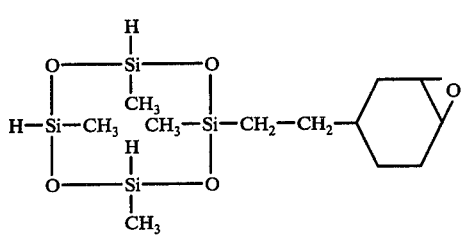
(1)

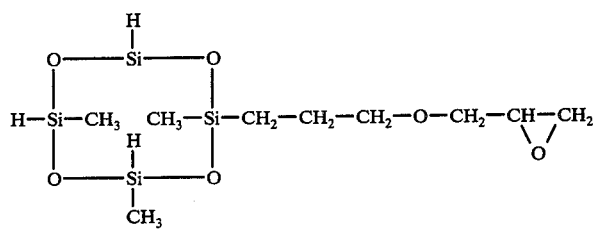
(2)

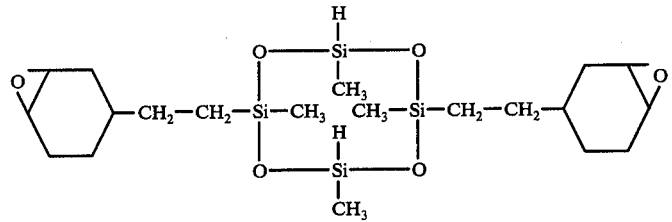
(3)

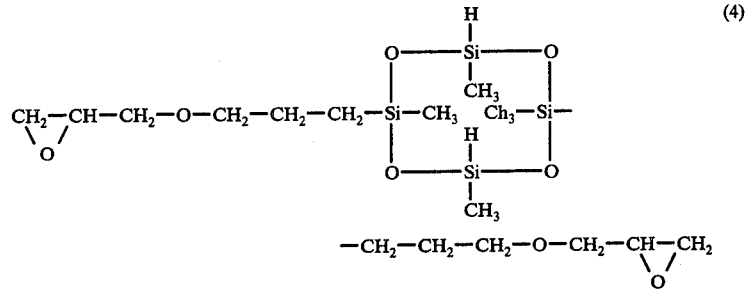
(4)

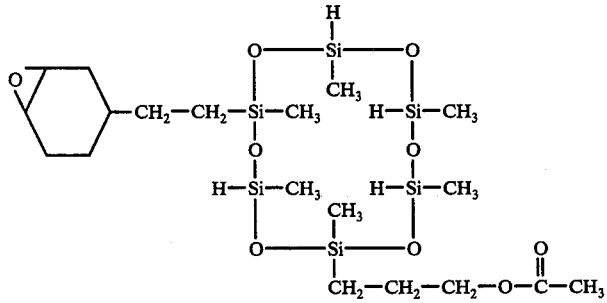 (5)

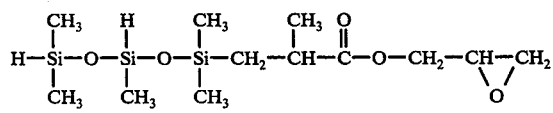 (6)

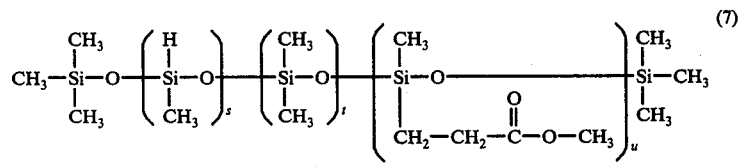 (7)

(Symbols s, t and u each are positive integers.)

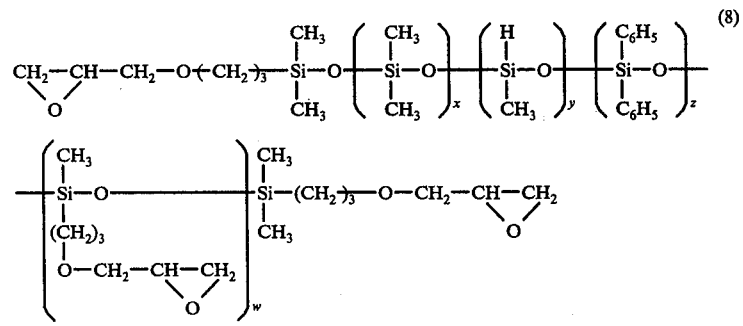 (8)

(Symbols x, y, z and w are positive integers.)

Next, Illustrative of the organohydrogenpolysiloxanes b-2, which may be used in combination with organohydrogenpolysiloxane b-1, are known compounds expressed by following structural formulas.

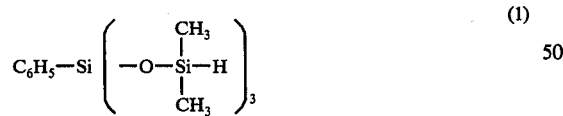 (1)

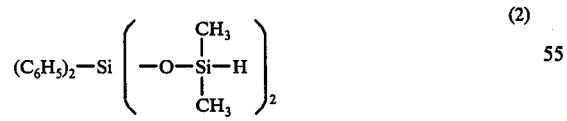 (2)

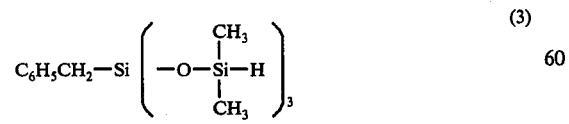 (3)

 (4)

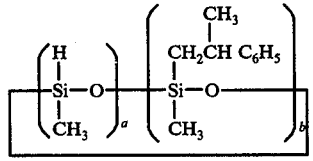 (5)

(Symbols a and b each are positive integers with the provisoes that (a + b) = 3 to 6 and that $a \leq 2$.)

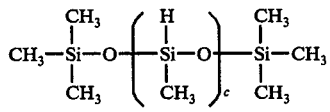 (6)

(symbol c is a positive integer not smaller than 2.)

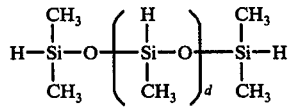 (7)

(symbol d has the same meaning as c above.)

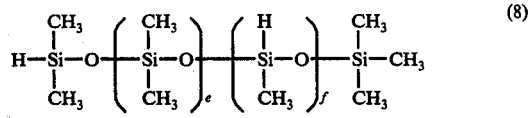 (8)

(symbols e and f each are positive integers.)

Further illustrative of the organohydrogenpolysiloxanes b-2 are copolymers composed of $CH_3HSiO$ units, $(CH_3)_3SiO_{0.5}$ units and $(CH_3)_2SiO$ units and copolymers composed of $(CH_3)_2HSiO_{0.5}$ units and $SiO_2$ units.

When component (b) employed in the method of the present invention is a mixture of organohydrogenpolysiloxanes b-1 and b-2, the ratio of mixing is preferably such that organohydrogenpolysiloxane b-1 is at least 1% by weight or, preferably, from 30 to 50% by weight of the total of b-1 and b-2. If the amount of b-1 is smaller than the above range, the resultant compositions tend to have unsatisfactory adhesive properties. The inclusion of organohydrogenpolysiloxane b-2 into the compositions of the invention is not always required, but is advisable from an economic point of view or when well balanced properties of cured products are to be obtained.

The amount of component (b) used in accordance with the invention is preferably such that from 0.5 to 4.0 or, more preferably, from 1.0 to 2.0 hydrogen atoms bonded directly to the silicon atoms are provided per vinyl group bonded directly to the silicon atom in component (a). When the amount of component (b) is smaller than the above range, the resultant cured products lack hardness, while the silicon-bonded hydrogen atoms exceeding the range result in the formation of foams in the finished compositions. Specifically, when component (b) consists solely of organohydrogenpolysiloxane b-1, it is recommended that the ratio of the silicon-bonded hydrogen atoms to the silicon-bonded vinyl groups is in the range from 1.0 to 1.5 in order to avoid the formation of foams.

The platinum compounds as component (c) may be any of the known platinum catalysts employed in the conventional hydrosilation. They are exemplified by chloroplatinic acid, chloroplatinic acid modified with an alcohol (see, for example, U.S. Pat. No. 3,220,972), complexes of chloroplatinic acid with olefins (see, for example, U.S. Pat. Nos. 3,159,601 and 3,159,662), and platinum black and metallic platinum borne on a carrier, such as, silica and alumina. These platinum catalysts are employed preferably in the form of a solution or a dispersion in a suitable organic solvent, such as, alcohols, ketones, ethers and hydrocarbons. It is desirable that the solid platinum catalysts are finely divided or that the carriers bearing metallic platinum have a particle size as small as possible, so that their specific surface area is increased and their dispersibility in the composition is improved.

The amount of the platinum catalyst as component (c) is determined in accordance with the desired velocity of curing. However, it may be recommended, from the standpoint of economy and for purposes of obtaining a satisfactory degree of cure, that the catalysts, such as, chloroplatinic acid, which are miscible with the organopolysiloxanes, are used in an amount ranging from 1 to 30 p.p.m by weight, and the solid catalysts, such as, platinum black, which are immiscible with the organopolysiloxanes, are used in an amount ranging from 20 to 500 p.p.m. by weight, both calculated as platinum based on the total amount of components (a) and (b).

The composition of the present invention can be obtained by merely blending components (a), (b) and (c) on a suitable blending machine just prior to use. The compositions are curable at room temperature, though it is optional to accelerate the curing with heat. It is especially advantageous to effect curing at a temperature higher than 100° C or, preferably, higher than 120° C, when a good adhesion to the surfaces of metals, glasses, ceramics and the like is of importance. It is a general trend that increased amounts of the platinum catalyst as component (c) cause acceleration of curing and improvement of the adhesion of the compositions. However, even with smaller amounts of the platinum catalyst, satisfactory adhesion can be obtained by the steps of curing and subsequent aging, that is, curing at a temperature of from room temperature to 100° C and aging at a temperature of from 120° to 150° C.

It is also possible to increase the velocity of curing by adding certain carboxylic acids, anhydrides thereof or certain basic catalysts, although care must be taken to avoid decreases in the adhesive strength and the danger of foaming due to the excessively high velocity of curing.

It is, of course, optional from the standpoint of practical use that various auxiliary additives are added to the composition, if necessary. For example, further improvement of the mechanical strengths of the resultant cured elastic bodies is achieved by the addition of a small amount, e.g., from 1 to 30% by weight based on component (a), of organopolysiloxanes with a resin structure composed of $SiO_2$ units, $(CH_2=CH)(R')_2SiO_{0.5}$ units, $(R')_3SiO_{0.5}$ units and, optionally, $(CH_2=CH)(R')SiO$ units, where R' is a monovalent hydrocarbon group having no olefinically unsaturated double bonds, such as, methyl and phenyl groups. The curing of the composition may be retarded by the addition of organopolysiloxanes containing $(CH_2=CH)(R'')SiO$ units where R'' has the same meaning as R' above, such as, 1,3,5,7-tetramethyl-1,3,5,7-tetravinylcyclotetrasiloxane and linear diorganopolysiloxanes composed of $(CH_2=CH)(R'')SiO$ units and $(R'')_2SiO$ units and terminated by $(R'')_3SiO_{0.5}$ units, ethynyl compounds and ionic compounds of heavy metals. Such retardants can be used when compositions including the three components (a), (b) and (c) need to be stored for a long period before use.

In the use of the auxiliary additives to prepare the compositions of the invention, it is also required that the molar ratio of the hydrogen atoms bonded directly to the silicon atoms to the total of the vinyl groups bonded directly to the silicon atoms in the composition is between 0.5 and 4.0.

Besides the above auxiliary additives, certain fillers may be added to the composition of the invention in order to bring about beneficial effects such that the compositions are protected from shrinkage during curing, the cured bodies have a reduced thermal expansion coefficient and the cured bodies have improved heat stability, weathering resistance, anti-chemicals resistance, flame retardancy and mechanical strength as well as a decreased gas permeability, at the sacrifice of transparency. Suitable fillers include fumed silica, finely divided quartz flour, glass fibers, carbon black, metal oxides, such as, iron oxide and titanium dioxide, and metal carbonates, such as, calcium carbonate and magnesium carbonate. If necessary, coloring agents, such as, pigments and dyes and anti-oxidants, may be added to the composition.

The compositions of the present invention are useful for applications, such as, potting of electronic circuit units, coating of electrical parts, impregnation of flyback transformers for television sets and coating of junctions for semiconductor devices.

It is optional that the compositions of the invention are applied in the form of a solution of an appropriate concentration in a suitable organic solvent, such as, toluene or xylene, if desired according to requirements of the particular end use.

The following examples illustrate the present invention. In the example, parts are all parts by weight.

EXAMPLE 1

An organopolysiloxane composition was prepared by uniformly blending (1) 100 parts of a linear dimethylpolysiloxane terminated at both chain ends with vinyl groups bonded directly to the terminal silicon atoms, having a viscosity of about 1,000 centistokes at 25° C. and expressed by the average structural formula

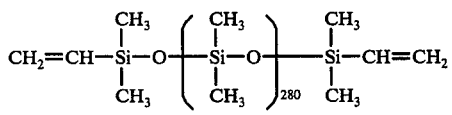

(2) 1.0 part of an epoxy-group containing orgahohydrogenpolysiloxane expressed by the structural formula

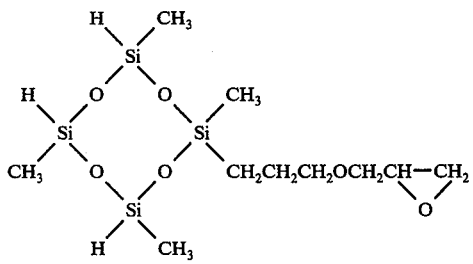

(3) 2.0 parts of a methylhydrogenpolysiloxane composed of 10 mole % of $(CH_3)_2HSiO_{0.5}$ units, 40 mole % of $(CH_3)HSiO$ units and 50 mole % of $(CH_3)_2SiO$ units and having a viscosity of about 11 centistokes at 25° C, and (4) 0.02 part of a solution of chloroplatinic acid in n-octyl alcohol, having a concentration of 2% as platinum.

Each of two test panels of copper 125 mm long, 25 mm wide and 0.3 mm thick was coated on one side covering the portion 10 mm from an end with the organopolysiloxane composition obtained above, and the coated portions were placed one upon another, so that the two test panels made a length of 240 mm. In this case, the coating layer in between had a thickness of about 2 mm. The thus formed composite was heated at 150° C for 2 hours to cure the organopolysiloxane composition to thus provide a test sample.

Then, this sample was subjected to a test for shearing adhesion. The results showed the good adhesive properties of the composition, with an 1.0 kg/cm² of adhesive strength and 100% of cohesive destruction.

Along with the above adhesion test, the cured composition was determined for the following properties.

| Hardness | 20 |
|---|---|
| Volume resistivity | $3.2 \times 10^{15}$ ohm-cm |
| Dielectric constant | 2.85 at 50 Hz. |

Note: The value of hardness as mentioned herein is what was determined in accordance with the Japanese Industrial Standard.

For comparative purposes, a composition was prepared with the same formulation as above except that the expoxy group-containing organohydrogenpolysiloxane was omitted, and the amount of the methylhydrogenpolysiloxane was increased to 3.2 parts with this composition. A similar adhesion test was conducted and as a result, it was found that no adhesion was obtained. The hardness of the cured product of the control composition was 25.

EXAMPLE 2

Uniform blends were prepared by mixing (1) 92 parts of a linear dimethylpolysiloxane terminated at both chain ends with vinyl groups bonded directly to the terminal silicon atoms, having a viscosity of about 5,000 centistokes at 25° C, and expressed by the following average structural formula

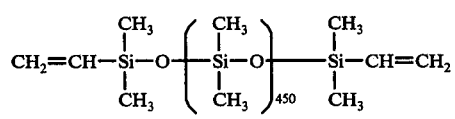

(2) 8 parts of an organopolysiloxane composed of 50 mole % of $SiO_2$ units, 42.5 mole % of $(CH_3)_3SiO_{0.5}$ units and 7.5 mole % of $(CH_2=CH)(CH_3)_2SiO_{0.5}$ units, (3) 0.1 part of 1,3,5,7-tetramethyl-1,3,5,7-tetravinylcyclotetrasiloxane, (4) 0.1 part of a solution of chloroplatinic acid modified with 2-ethylhexyl alcohol, having a concentration of 2% as platinum, (5) 25 parts of a finely divided silica filler having a specific surface area of about 150 m²/g, and (6) 3 parts of titanium dioxide of the anatase type. The resulting blends had a viscosity of approximately 90,000 centipoise at 25° C.

To 100 parts of each of the above-obtained blends was added one of the under-mentioned epoxy or ester group-containing organohydrogenpolysiloxanes (A) to (D) in a varied amount as indicated in Table 1, followed by uniform mixing, to produce the desired composition.

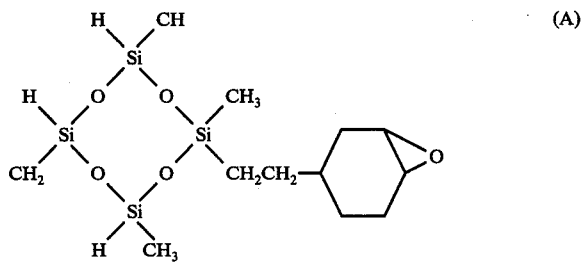

(A)

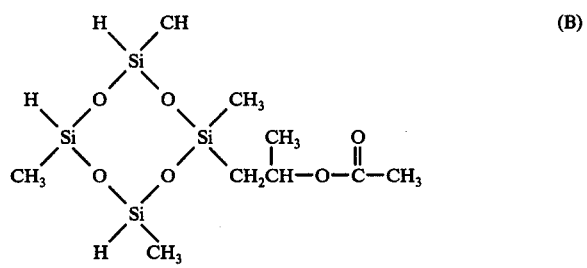

(B)

-continued

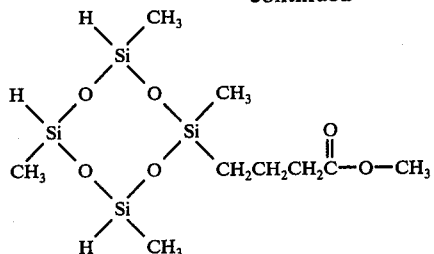
(C)

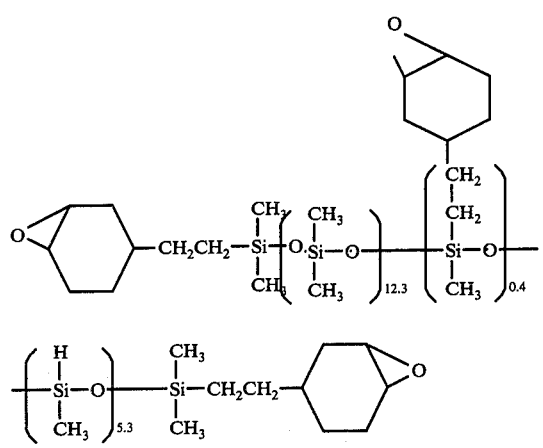
(D)

With each of the compositions thus produced, a test sample was prepared in accordance with the same manner as in Example 1 except that a test panel concerned was made of aluminum, instead of copper, and the test sample was subjected to an adhesion test to determine its strength of adhesion and cohesive destruction. The results are set out in Table I. Further, the cured compositions obtained by stepwise curing, say, at 105° C for 1 hour and then at 150° C for another 2 hours, were determined for their hardness, with the results as set out also in the table.

For comparative purposes, a control composition was prepared with the same formulation as above except that the organohydrogenpolysiloxane was one which contained no epoxy or ester group and expressed by the average structural formula (E):

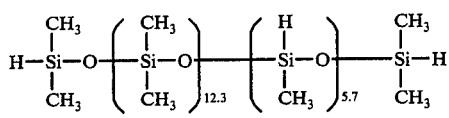

The amounts of the organohydrogenpolysiloxane used and the results of similar tests are set out in Table I.

Table I

|  | Organohydrogenpolysiloxane | | | | |
| --- | --- | --- | --- | --- | --- |
|  | A | B | C | D | E |
| Organohydrogen-polysiloxane, parts | 1.6 | 1.5 | 1.5 | 3.8 | 2.5 |
| Strength of adhesion, kg/cm² | 26.1 | 13.2 | 15.5 | 21.7 | 0 |
| Cohesive destruction, % | 100 | 100 | 100 | 100 | 0 |
| Hardness | 38 | 28 | 25 | 45 | 42 |

It is learned from the data in the table that excellent adhesion can be obtained with the composition in which an epoxy or ester group containing organohydrogenpolysiloxane was included.

Incidentally, for the purpose of supplemental explanation, the method of preparing the epoxy group-containing organohydrogenpolysiloxane (D) taken as the representative for (A) to (D) is described in the following.

Into a 2-liter, four-necked flask, equipped with a stirrer, a reflux condenser, a thermometer and a dropping funnel, were put 462 g of organohydrogenpolysiloxane (E) employed in the preparation of the control composition above, 33 g of vinylcyclohexene epoxide, 445 g of toluene and 0.067 g of a solution of chloroplatinic acid in 2-ethylhexyl alcohol having a concentration of 2% as platinum. The mixture was heated with stirring to 70° to 80° C, followed by dropping thereinto 66.2 g of vinylcyclohexene epoxide with continued stirring over a period of about 15 minutes. After completion of the dropping, the mixture in the flask was further stirred for additional 1½ hour at temperatures between 75° to 80° C. Thereupon, 0.7 g of dibenzothiazolyl disulfide was added and dissolved in the reaction mixture, followed by distilling off of toluene and unreacted vinylcyclohexene epoxide under reduced pressure. The resultant mixture was then cooled to room temperature and treated with active charcoal in order to remove the dibenzothiazolyl disulfide, to obtain the desired organohydrogenpolysiloxane, which had the following properties.

| Content of non-volatile matter, measured after 3 hours at 105° C | 97.5% |
| --- | --- |
| Viscosity at 25° C | 40 centistokes |
| Content of silicon-bonded hydrogen atoms | 0.0032 mole/g |

EXAMPLE 3

A clear, yellow solution having a viscosity of about 5,100 centistokes at 25° C was obtained by uniformly blending a mixture of (1) 80 parts of a linear dimethylpolysiloxane terminated at both chain ends with vinyl groups directly bonded to the terminal silicon atoms, having a viscosity of about 5,000 centistokes at 25° C and expressed by the average structural formula

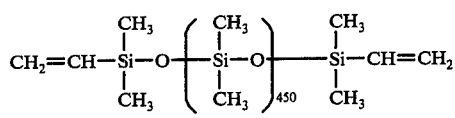

(2) 20 parts of an organopolysiloxane composed of 50 mole % of $SiO_2$ units, 42.5 mole % of $(CH_3)_3SiO_{0.5}$ units and 7.5 mole % of $(CH_2=CH)(CH_3)_2SiO_{0.5}$ units, (3) 0.35 part of 1,3,5,7-tetramethyl-1,3,5,7-tetravinylcyclotetrasiloxane and (4) 0.05 part of solution of chloroplatinic acid in 2-ethylhexyl alcohol, having a concentration of 2% as platinum.

To 100 parts of the above-obtained solution were added 2 parts of orgahohydrogenpolysiloxane (A) employed in Example 2 and 4.3 parts of the same methylhydrogenpolysiloxane as employed in Example 1, to produce a sample composition of the present invention. Separately, to 100 parts of the same solution was added 7 parts of the same methylhydrogenpolysiloxane only, to produce a sample composition of control.

The adhesion tests were conducted with those sample compositions in the same manner as in Example 1 except that the test panels were made of nickel-plated iron instead of copper and the curing was effected stepwise at room temperature for 16 hours and then at 150° C for 4 hours. The results of the strength of adhesion and cohesive destruction tests are set out in Table II, together with the various properties of the cured compositions.

Table II

|  | Present Invention | Control |
|---|---|---|
| Strength of adhesion, kg/cm$^2$ | 8.1 | 0.8 |
| Cohesive destruction, % | 100 | 0 |
| Hardness | 45 | 50 |
| Tensile strength, kg/cm$^2$ | 45 | 61 |
| Elongation at break, % | 145 | 140 |
| Volume resistivity, ohm-cm | 4.9 × 10$^{15}$ | 9.3 × 10$^{15}$ |
| Breakdown voltage, kv/mm | 26 | 28 |
| Dielectric constant at 50 Hz | 2.90 | 2.85 |
| Dielectric tangent at 50Hz | 4 × 10$^{-4}$ | 2.8 × 10$^{-4}$ |

Along with the above, to 100 parts of the same clear, yellow solution were added 40 parts of a finely divided silica filler and 1 part of iron oxide. The mixture was thoroughly blended on a three-roller mill, to produce a uniform dispersion. To each dispersion thus produced was added 3.3 parts of the epoxy group-containing organohydrogenpolysiloxane (A) employed in Example 2, to form a sample composition of the present invention or the same amount of an organohydrogenpolysiloxane having no epoxy or ester groups and expressed by the following structural formula (F), to form a sample composition of control.

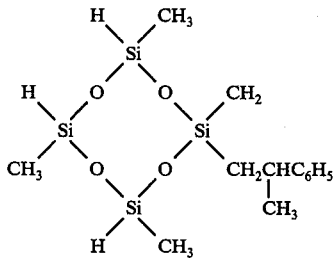

The adhesion tests were conducted with these sample compositions in the same manner as in Example 1 except that the test panels were made of stainless steel instead of copper and the curing was effected by heating at 160° C for 16 hours. The results of the adhesion and cohesive destructive tests are set out in Table III together with the hardness of the cured composition, which indicate the superiority of the composition of the present invention, containing the organohydrogenpolysiloxane with epoxy groups in its molecules.

Table III

|  | Present Invention | Control |
|---|---|---|
| State of adhesion | Good | No adhesion |
| Cohesive destruction, % | 100 | 0 |
| Hardness | 43 | 25 |

EXAMPLE 4

Uniform blends were prepared by mixing (1) 100 parts of a linear dimethylpolysiloxane having a viscosity of about 600 centistokes at 25° C, terminated at both chain ends with vinyl groups directly bonded to the terminal silicon atoms, and expressed by the average structural formula

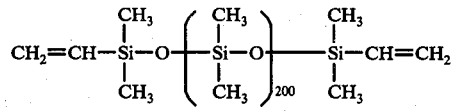

(2) 3 parts of a methylvinylpolysiloxane composed of 5 mole % of $(CH_3)_3SiO_{0.5}$ units, 20 mole % of $(CH_2=CH)(CH_3)SiO$ units and 75 mole % of $(CH_3)_2SiO$ units, (3) 0.4 part of a solution of $(C_2H_4PtCl_2)_2$ in benzene having a concentration of 0.5% as platinum, (4) 150 parts of quartz flour with an average particle diameter of about 1 μm and (5) 3 parts of iron oxide. The organohydrogenpolysiloxane (A) employed in Example 2 was added to 100 parts of each blend, in a varied amount as indicated in Table IV, to form sample compositions.

The adhesion tests were undertaken with the compositions in the same manner as in Example 1 with the exception that the test panels employed were made of chrominum-plated iron instead of copper and the curing was effected by heating at 105° C for 16 hours. The results are set out in Table IV. From the data in the table, it may be concluded that excessive amounts of the epoxy group-containing orgahohydrogenpolysiloxane eventually leads to the occurrence of foams during the curing process.

Table IV

| Amount of organohydrogen-polysiloxane (A), parts | 0.8 | 1.1 | 1.7 | 2.3 |
|---|---|---|---|---|
| State of adhesion | Fair | Good | Good | Good. A little foaming |
| Cohesive destruction, % | 70 | 100 | 100 | 100 |
| Hardness | 58 | 70 | 72 | 75 |

EXAMPLE 5

A uniform blend was prepared by mixing (1) 100 parts of a linear diorganopolysiloxane having a viscosity of about 3,000 centistokes at 25° C, terminated at both chain ends with vinyl groups directly bonded to the terminal silicon atoms, and expressed by the average structural formula

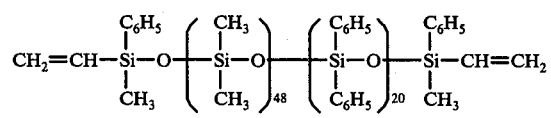

(2) 0.12 part of an ethynyl group-containing silane expressed by the structural formula

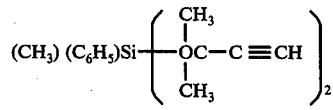

(3) 4.4 parts of the same epoxy group-containing organohydrogenpolysiloxane as employed in Example 1, (4) 0.025 part of a solution of chloroplatinic acid in 2-ethylhexyl alcohol with a concentration of 2% as platinum and (5) 8 parts of trimethylchlorosilane-treated finely divided silica filler with a specific surface area of about 150 m$^2$/g, to form a composition. This composition was stable without gellation on storage for a month at 40° C.

A semiconductor silicon wafer was adhesively bonded to a test panel of glass by sandwiching a 2 mm layer of the above composition, followed by curing at 150°0 C for 1 hour, to form a test sample. The shearing adhesion test on the test sample exhibited a 2.0 kg/cm$^2$ strength of adhesion and a 100% cohesive destruction. The hardness of the cured composition was 25.

EXAMPLE 6

A uniform blend was prepared by mixing (1) 100 parts of a linear dimethylpolysiloxane with a viscosity of about 3,000 centistokes at 25°0 C, terminated at both chain ends with vinyl groups directly bonded to the terminal silicon atoms, and expressed by the average structural formula

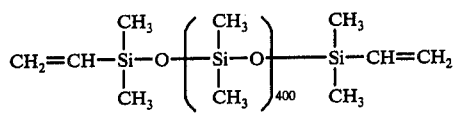

(2) 1 part of an organopolysiloxane composed of 52.80 mole % of SiO$_2$ units, 2.64 mole % of (CH$_3$)(CH$_2$=CH)SiO units, 2.32 mole % of (CH$_3$)$_2$SiO units, 5.28 mole % of (CH$_3$)$_2$(CH$_2$=CH)SiO$_{0.5}$ units and 36.96 mole % of (CH$_3$)$_3$SiO$_{0.5}$ units, (3) 1 part of the same ethynyl group-containing silane as employed in Example 5, (4) 0.1 part of orgahohydrogenpolysiloxane (D) of Example 2, (5) 4 parts of organohydrogenpolysiloxane (E) of Example 2, (6) 0.025 part of a solution of chloroplatinic acid in 2-ethylhexyl alcohol with a concentration of 2% as platinum, (7) 4 parts of the same finely divided silica filler as employed in Example 5 and (8) 1 part of titanium dioxide of the anatase type, to form a composition of the present invention. This composition was stable in its viscosity even after storage for 3 months at 25°0 C.

The adhesion test was conducted with this composition in the same manner as in Example 1 with the exception that the test panels were of a thermally-cured phenol-formaldehyde resin instead of copper and the curing was effected by heating at 105° C for 16 hours. The results of the test and the properties of the cured product were as follows.

| | |
|---|---|
| Strength of adhesion, kg/cm$^2$ | 1.8 |
| Cohesive destruction, % | 100 |
| Hardness | 22 |
| Tensile strength, kg/cm$^2$ | 6 |
| Elongation at break, % | 160 |
| Volume resistivity, ohm-cm | 1.0 × 10$^{15}$ |
| Dielectric constant at 50 Hz | 2.80 |

For comparison, another composition was prepared with the same formulation as above excepting only the omission of the organohydrogenpolysiloxane (D). A similar adhesion test resulted to indicate that the composition was not adhesive at all to the phenolformaldehyde resin material, with 0% cohesive destruction.

What is claimed is:

1. A curable organopolysiloxane composition comprising
   (a) a diorganopolysiloxane having a viscosity in the range from 10 to 1,000,000 centistokes at 25° C, terminated at both chain ends with vinyl groups directly bonded to the terminal silicon atoms and expressed by the general formula

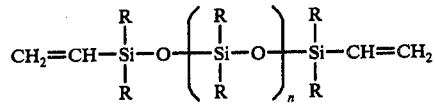

where R is a monovalent hydrocarbon group having no aliphatic unsaturation and n is a positive integer,
   (b) an organohydrogenpolysiloxane or a mixture of organohydrogenpolysiloxanes having at least two hydrogen bonded directly to the silicon atoms in a molecule, at least 1% by weight of said organohydrogenpolysiloxane or organohydrogenpolysiloxanes having at least one epoxy group or ester group in a molecule, in an amount sufficient to provide from 0.5 to 4.0 hydrogen atoms bonded directly to the silicon atoms per vinyl group in component (a), and (c) platinum or a platinum compound in a catalytic amount.

2. The curable composition as claimed in claim 1, wherein all of the monovalent hydrocarbon groups denoted by symbol R are methyl groups.

3. The composition as claimed in claim 1, wherein component (a) is a compound expressed by the general formula

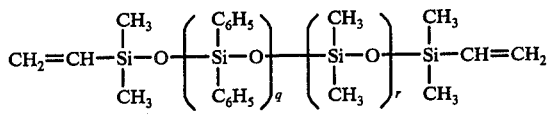

where q and r each are positive integers with the provisoes that (q + r)=50 to 500 and that r/q=1 to 9.

4. The composition as claimed in claim 1, wherein component (a) has a viscosity in the range of from 500 to 10,000 centistokes at 25° C.

5. The composition as claimed in claim 1, wherein said epoxy group contained in component (b) is in the form of a glycidyl group or a 3,4-epoxycyclohexyl group.

6. The combination as claimed in claim 1, wherein said ester group contained in component (b) is in the form of

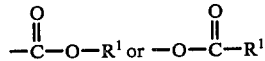

where R$^1$ is a lower alkyl group.

7. The composition as claimed in claim 1, wherein said epoxy group or ester group contained in component (b) is bonded to the silicon atoms in the siloxane molecule through carbon atoms adjacent to the silicon atoms.

8. The composition as claimed in claim 1, wherein said organohydrogenpolysiloxane having at least one epoxy group or ester group in a molecule has from 3 to 300 silicon atoms in a molecule.

9. The composition as claimed in claim 1, wherein from 30 to 50% by weight of said mixture of organohydrogenpolysiloxane has at least one epoxy group or ester group in a molecule.

10. The composition as claimed in claim 1, wherein the amount of component (b) is such that from 1.0 to 2.0 hydrogen atoms bonded directly to the silicon atoms in components (b) are provided per vinyl group in component (a).

11. The composition as claimed in claim 1, wherein component (b) is an organohydrogenpolysiloxane having at least one epoxy group or ester group in a molecule in an amount such that from 1.0 to 1.5 hydrogen atoms bonded directly to the silicon atoms therein are provided per vinyl group in component (a).

12. The composition as claimed in claim 1, wherein said platinum compound is selected from the group consisting of chloroplatinic acid, chloroplatinic acid modified with an alcohol and complexes of chloroplatinic acid with olefins.

13. The composition as claimed in claim 12, wherein the amount of said platinum compound is in the range from 1 to 30 p.p.m. by weight as platinum based on the total amount of components (a) and (b).

14. The curable organopolysiloxane composition as claimed in claim 1, further comprising at least one compound selected from the group consisting of carboxylic acid, anhydrides thereof and basic compounds.

15. The curable organopolysiloxane composition as claimed in claim 1, further comprising an ethynyl compound.

16. The curable organopolysiloxane composition as claimed in claim 1, further comprising an inorganic filler.

17. A curable organopolysiloxane composition comprising
(a) a mixture of vinyl-containing organopolysiloxanes composed of 70 to 99% by weight of a diorganopolysiloxane having a viscosity in the range from 10 to 1,000,000 centistokes at 25° C, terminated at both chain ends with vinyl groups directly bonded to the terminal silicon atoms and expressed by the general formula

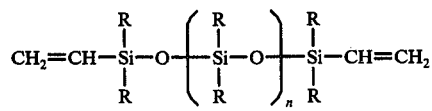

where R is a monovalent hydrocarbon group having no aliphatic unsaturation and $n$ is a positive integer, and 30 to 1% by weight of an organopolysiloxane with a resin structure comprising $SiO_2$ units, $(CH_2=CH)(R')_2SiO_{0.5}$ units and $(R')_3SiO_{0.5}$ units, where $R'$ is a methyl or phenyl group, (b) an organohydrogenpolysiloxane or a mixture of organohydrogenpolysiloxanes having at least two hydrogen atoms bonded directly to the silicon atoms in a molecule, at least 1% by weight of said organohydrogenpolysiloxane or organohydrogenpolysiloxanes having at least one epoxy group or ester group in a molecule, in an amount sufficient to provide from 0.5 to 4.0 hydrogen atoms bonded directly to the silicon atoms per vinyl group in component (a), and (c) platinum or a platinum compound in a catalytic amount.

* * * * *